Patented May 21, 1940

2,201,553

UNITED STATES PATENT OFFICE 2,201,553

TREATMENT OF MOTOR FUELS

Frederic R. Bean, Rochester, N. Y., assignor to Eastman Kodak Company, Rochester, N. Y., a corporation of New Jersey No Drawing. Original application April 3, 1937, Serial No. 134,902. Divided and this application November 27, 1937, Serial No. 176,892

6 Claims. (Cl. 44—9)

This invention relates to N-furfurylaminophenols and to motor fuels stabilized therewith.

This application is a division of my copending application Serial No. 134,902, filed April 3, 1937.

An object of my invention is to provide N-furfurylaminophenols and their salts. A further object is to provide a process for the preparation of such aminophenols and salts. A still further object is to provide motor fuels stabilized with N-furfurylaminophenols and a process for the preparation of such motor fuels. Other more specific objects will become apparent hereinafter.

I have found that N-furfurylaminophenols can be prepared by reducing a N-furfurylidene aminophenol. The reduction can be accomplished, for example, by treating a furfurylidene compound dissolved in a strong base with a metal capable of releasing hydrogen from the strong base. Metals such as zinc, magnesium, or aluminium are suitable, for example. According to one embodiment of my invention furfuraldehyde and an aminophenol are treated with an alkaline reducing agent. The furfuraldehyde and aminophenol probably react to form a furfurylidene aminophenol which is then reduced to the furfurylaminophenol. Strong bases, such as sodium hydroxide, potassium hydroxide, or benzyltrimethyl ammonium hydroxide are suitable for example, in carrying out my new process. Lithium hydroxide can be used. The aminophenol is advantageously dissolved in aqueous alkali and the furfuraldehyde added to the aqueous solution. The metal, advantageously in a finely divided or activated form is then added gradually to the aqueous mixture. The process is advantageously conducted in the absence of oxidants, such as air or other oxidizing gases. The process is advantageously begun at temperatures of about 5° C. or less. 0° to 10° C. is a suitable range of starting temperatures. During the course of the reaction the temperature can be held at about 5° C. or can be allowed to rise gradually to about 25° C., although higher temperatures can be employed.

The following example serves to illustrate the preparation of the products of my invention. This example is not intended to limit my invention.

EXAMPLE

N-Furfuryl-p-aminophenol 218 g. (2 mol.) of p-aminophenol were dissolved in 5,000 cc. of water containing 142 g. (3.5 mol.) of sodium hydroxide. The solution was placed in a vessel equipped with a means of stirring and the air in the vessel displaced with a non-oxidizing gas, such as hydrogen or nitrogen. (Owing to the hydrogen which escapes from the reaction mixture during the process, displacement of the air is not essential.) The solution was cooled to about 5° C. 192 g. (2 mol.) of furfuraldehyde were added. While stirring vigorously, 100 g. of activated aluminum were added gradually. After addition of the activated aluminum, the reaction mixture was stirred rapidly for from two to four hours at about 25° C. The reaction mixture was then made just acid with sulfuric acid. The resulting solution was concentrated to a volume of about 2500 cc. decolorized with activated charcoal and upon cooling the decolorized solution N-furfuryl-p-aminophenol sulfate separated out.

Upon dissolving the sulfate in water and making the solution just alkaline with sodium carbonate mixed with a little sodium sulfite, N-furfuryl-p-aminophenol separated out in the form of white crystals melting at 110°–111° C. Its nitroso derivative melts 95°–98° C. The nitroso derivative was prepared by treating an aqueous solution of N-furfuryl-p-aminophenol sulfate acidified with sulfuric acid with aqueous sodium nitrite. The nitroso derivative separated out at ordinary temperatures as in oily liquid which slowly solidified.

The formula for N-furfuryl-p-aminophenol is:

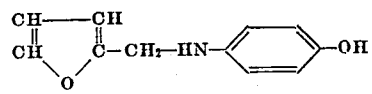

N-furfuryl-p-aminophenol can be converted into its salts, such as its hydrochloride, by treating with the corresponding acid.

In a manner like that illustrated above N-furfuryl-m-aminophenol can be prepared from m-aminophenol or N-furfuryl-1-amino-2-methyl-4-hydroxybenzene or N-furfuryl-1-amino-3,4-dihydroxybenzene can be prepared from 1-amino-3,4-dihydroxybenzene. Instead of aqueous alkali in the above example, methyl alcoholic alkali or an aqueous or methyl alcoholic solution of a quaternary ammonium hydroxide can be used. N-furfurylidene-p-aminophenol can be prepared by reacting furfuraldehyde with p-aminophenol and then reduced as in the above example.

A convenient method for preparing an activated aluminium is as follows:

100 g. of aluminium in the form of small flakes was treated in 10 g. portions with a solution of mercuric chloride. The 10 g. portion was added to 30–40 cc. of water containing 0.17 g. of mercuric chloride. The mixture was stirred while cooling for about 10 minutes during which period the temperature rose to about 25°–30 C. The aqueous mixture was then employed without separation of the aluminium to add to the reaction mixture containing the aminophenol, furfuraldehyde and alkali.

I have found that motor fuels stable to deterioration can be prepared employing N-furfurylaminophenols. Hydrocarbon distillates and more particularly those hydrocarbon distillates known in the petroleum trades as cracked hydrocarbon distillates or motor fuels made therefrom are ordinarily characterized by a tendency to undergo deterioration manifested by a loss in knockrating, the formation of color or the formation of gummy or resinous materials. This deterioration is undesirable, since it is important to preserve the knock-rating of a motor fuel and the gummy or resinous material tends to deposit in the induction system of the carburetor and intakes valves impairing or even preventing the operation of the motor. The formation of color impairs the marketing of the motor fuel. I have found that deterioration in motor fuels can be substantially inhibited or retarded by dispersing a small amount of one or more N-furfurylaminophenols in the hydrocarbon distillate or motor fuel. I have found that the N-furfurylaminophenols are especially advantageously employed in preparing motor fuels stabilized against gum or resinous materials formation, which formation may or may not be attended by a loss of knockrating and/or color formation in the absence of a stabilizer (inhibitor).

My new stabilizers (N-furfurylaminophenols) are applicable to any motor fuel comprising hydrocarbons which normally, i. e. without stabilization, undergoes deterioration, particularly deterioration characterized by gum or resinous material formation. Such motor fuels are commonly referred to in the trades under such names as gasoline, petrol, and the like, and contain in part or in whole unstable constituents such as unsaturated hydrocarbons of various sorts. My new stabilizers are particularly useful for stabilizing unsaturated hydrocarbon products or distillates, useful as motor fuels, produced by cracking higher boiling hydrocarbon oils as well as for stabilizing blends of such products or distillates with the so-called straight-run distillates from petroleum. My new stabilizers are likewise useful for stabilizing hydrocarbon products, useful as motor fuels, produced by cracking or destructive distillation of substances containing carbon and hydrogen, but containing a lesser proportion of hydrogen than petroleum oils, such as bituminous materials, for example, coal, peat, lignite and the like. My new stabilizers are also useful for stabilizing hydrocarbon products, useful as motor fuels, produced by the polymerization of unsaturated hydrocarbons, such as butenes, pentenes and the like.

The tendency of a motor fuel or hydrocarbon product to form gum or resinous products can be determined, among other methods, by an accelerated oxidation test. While there are various methods of carrying out such a test, the method described by Egloff, Morell, Lowry and Dryer in Industrial and Engineering Chemistry, vol. 24, pages 1375–1378 (1932) is very satisfactory and widely used. Briefly, the described method is as follows: A sample of the motor fuel or hydrocarbon products to be tested, in an open eight-ounce bottle, is placed in a suitable metal bomb surrounded by a water-bath. Oxygen is introduced to 100 pounds per square inch (7 kg. per sq. cm.) pressure. The bath is then heated by steam to 100° C. As the temperature increases the pressure rises, reaches a maximum and continues near this maximum for a shorter or longer period of time. The test is continued for four hours or until a break in the pressure curve is noted. The period from slightly before attainment of maximum pressure (approximately 15 minutes from the beginning of heating) until more than a slight drop in pressure takes place (usually a sharp break in the pressure curve occurs) is recorded as the induction period.

An induction period of less than 75 minutes is usually indicative of very low stability, while an induction period of 300 or more minutes for freshly made motor fuels or hydrocarbon products produced by cracking usually represents a fuel possessing stability suitable for from about six to about twelve month's bulk storage in the northern half of the United States. For more southern and warmer climates the induction period should be increased somewhat for satisfactory bulk storage of about a year's duration. The induction period should always be determined on the freshly prepared motor fuel or hydrocarbon product, since the induction period determined on partially aged material is probably not a reliable test. N-furfurylaminophenols can be illustrated by reference to the inhibiting ability of N-furfuryl-p-aminophenol.

*Table*

| | N-furfuryl-p-aminophenol |
|---|---|
| a. Percent conc. of stabilizer in motor fuel | 0.0025 |
| b. Induction period of standard reference fuel (min.) | 140.0 |
| c. Induction period of stabilized motor fuel (min.) | 540.0 |
| d. Increase in induction period (min.) | 400.0 |

From these data, it is clear that N-furfuryl-p-amino-phenol is a very potent stabilizer. It is more potent than N-benzyl-p-aminophenol. The oxygen-containing furfuryl radical appears to exert some influence which results in the strong inhibiting power of the furfurylaminophenols.

The quantity of my furfurylaminophenols which should be added to the motor fuel or hydrocarbon product will depend upon the nature of the furfurylaminophenol, the type of motor fuel being stabilized and the conditions of storage. Ordinarily an amount of my new furfurylaminophenols equal to 0.01 g. to about 1.0 g. per 1000 g. of motor fuel or hydrocarbon product, i. e., from about 0.001% to about 0.1% by weight, will suffice. Usually each motor fuel or hydrocarbon product to be stabilized will require a separate test, the details of making which are described above. Modifications of the hereinabove described test and other tests are well known to those skilled in the art.

My new furfurylaminophenols should be added to the freshly prepared motor fuel or hydrocarbon product, since partially aged materials usually cannot be effectively stabilized. When stabilizing smaller quantities of motor fuel, up to 2000 barrel lots, my new stabilizers can be introduced directly into the tank or other container of freshly prepared motor fuel, by adding the stabilizer portionwise, using small portions, while vigorously agitating the stock being treated or causing the same to circulate, for instance, by pumping the contents of the lower part of the container to the top. In adding my new stabilizers to larger batches of motor fuels, the stabilizer can be added on the suction side of the pump in the form of a slurry in the motor fuel, or by means of a suitable feeding device, to a stream of the motor fuel passing to storage. The quantity of stabilizer added in such a manner should always be well below its maximum solubility in the motor fuel, and the pipe line to the storage tank should be long enough to allow the stabilizer to dissolve before it reaches the storage tank. My new stabilizers can be added to motor fuels in the form of solutions of the stabilizers in solvents which are miscible or but partially miscible with the ordinary motor fuel. Agitation and circulation are advisable during the addition. Solutions in methanol are satisfactory. In all cases it is advantageous to have the stabilizers completely dissolved in the motor fuel.

What I claim as my invention and desire to be secured by Letters Patent of the United States is:

1. A motor fuel comprising hydrocarbons and normally tending to deteriorate containing a N-furfurylaminophenol in an amount sufficient to substantially inhibit the deterioration.

2. A motor fuel comprising hydrocarbons and normally tending to deteriorate containing a N-furfuryl-p-aminophenol in an amount sufficient to substantially inhibit the deterioration.

3. A motor fuel comprising hydrocarbons and normally tending to deteriorate containing N-furfuryl-p-aminophenol in an amount sufficient to substantially inhibit the deterioration.

4. A motor fuel comprising hydrocarbons and normally tending to deteriorate containing a compound containing a N-furfuryl-aminophenol group in an amount sufficient to substantially inhibit the deterioration.

5. A motor fuel comprising hydrocarbons and normally tending to deteriorate containing a compound containing a N-furfuryl-p-aminophenol group in an amount sufficient to substantially inhibit the deterioration.

6. A process for preparing a stable motor fuel comprising dispersing a N-furfurylaminophenol in a motor fuel comprising hydrocarbons and normally tending to deteriorate.

FREDERIC R. BEAN.

CERTIFICATE OF CORRECTION.

Patent No. 2,201,553.　　　　　　　　　　　　　　　May 21, 1940.

FREDERIC R. BEAN.

It is hereby certified that error appears in the printed specification of the above numbered patent requiring correction as follows: Page 1, second column, line 41, after the word "hydroxybenzene" insert --can be prepared from 1-amino-2-methyl-4-hydroxybenzene--; page 2, first column, line 3, for "25°-30 C." read --25°-30° C.--; and that the said Letters Patent should be read with this correction therein that the same may conform to the record of the case in the Patent Office.

Signed and sealed this 17th day of September, A. D. 1940.

(Seal)　　　　　　　　　　　　　　　　　　　　　　　　Henry Van Arsdale,
　　　　　　　　　　　　　　　　　　　　　　Acting Commissioner of Patents.